US005781698A

United States Patent [19]
Teller et al.

[11] Patent Number: 5,781,698
[45] Date of Patent: Jul. 14, 1998

[54] METHOD OF AUTONOMOUS MACHINE LEARNING

[75] Inventors: Astro (Eric) Teller; Manuela Veloso, both of Pittsburgh, Pa.

[73] Assignee: Carnegie Mellon University, Pittsburgh, Pa.

[21] Appl. No.: 551,154

[22] Filed: Oct. 31, 1995

[51] Int. Cl.⁶ .................................................. G06F 15/18
[52] U.S. Cl. .................................................. 395/13
[58] Field of Search .............................. 395/13, 50-51, 395/64, 900

[56] References Cited

U.S. PATENT DOCUMENTS

| | | | |
|---|---|---|---|
| 4,697,242 | 9/1987 | Holland et al. | 395/13 |
| 4,821,333 | 4/1989 | Gillies | 395/13 |
| 5,136,686 | 8/1992 | Koza | 395/19 |
| 5,222,192 | 6/1993 | Shaefer | 395/19 |
| 5,394,509 | 2/1995 | Winston | 395/19 |

*Primary Examiner*—Tariq R. Hafiz
*Attorney, Agent, or Firm*—Kirkpatrick & Lockhart LLP

[57] ABSTRACT

A classifier for signal classification based on a plurality of classification signals can be generated in three phases: a training phase, an orchestration phase, and a final classifier phase. In the training phase, genetic programming techniques are used to evolve a population of classification programs to produce a series of groups within the population, each of which is the best able to classify one type of input signal from all other signals. In the orchestration phase, the best programs from each group are selected and placed in a hierarchy of systems, wherein each system contains the best programs that are able to classify one type of input signal from all other signals. Default weights are assigned to each system and each program within a system. Training signals are input into the selected programs, output values for each program and system are generated, and the weights associated with the programs and systems are adjusted. The final classifier is the final hierarchy of systems of selected programs used for the classification of signals with unknown labels. The genetic programming techniques used in the training phase can also be applied to populations of computer programs other than signal classification programs such as operator programs.

28 Claims, 8 Drawing Sheets

5,781,698

METHOD OF AUTONOMOUS MACHINE LEARNING

BACKGROUND OF THE INVENTION

1. Field of the Invention

The present invention is directed generally to evolving computer programs capable of effectuating autonomous machine learning. More specifically, it is directed to systems constructed of such programs and the use of such systems for signal classification.

2. Description of the Background

Databases of acoustic and visual signals are becoming increasingly plentiful around the world. However, huge databases without powerful search mechanisms are almost useless. Realizing this, some database administrators try to label their signals as they are put into their databases. Using these labels, standard database search technologies can be applied to these keys. For example, a photography database could classify its photographs with keys such as "photographer," "subject," "date," and so on.

This kind of effort, however, is enormous. Moreover, queries on such databases are limited to information stored as labels. Unique queries concerning matters not covered by the labels would be impossible. Further, there is no one standard for how to encode the signals, let alone possible signal labels.

In the recent past, there have been some attempts at automating the process of recognition and classification of signals. This automation has taken the form of machine learning and statistical techniques. The goal of such efforts has typically been to acquire knowledge from large databases.

Nevertheless, current approaches have not accomplished the examination and retrieval of arbitrary database elements as large and unprocessed as real image and acoustic data. Any method for data mining has, at its heart, a function for determining whether a particular database element has the right "features" requested in a user's query. Machine learning applied to data mining involves the learning of some or all of that classification function. This determination is much harder for machine learning or statistical techniques when the signals are extremely large or unprocessed.

Current approaches to machine learning include systems using a number of well constrained images of objects as models for object recognition using visual data. Such models may be explicit, usually highly geometrical in shape, or implicit hand-coded features. The goal of such systems is to attempt to find modeled objects within the image and to identify their poses. These approaches, however, cannot work for high resolution, noisy images of real world objects in a natural setting.

Neural networks have also been used at a larger level for machine learning. Even with today's technology, however, neural networks cannot accept full video images as input. Training a net for even small images using back propagation would take an enormous amount of time. Although preprocessing can be utilized to reduce the images' resolution while preserving relevant information, preprocessing does not solve the difficulty of creating an effective classification function or algorithm. Preprocessing merely shifts the difficulties involved with creating an effective classification function or algorithm to creating an effective preprocessor.

Finally, genetic programming has been used for machine learning under current technology. Genetic programming to date has been used for bitmap recognition (usually with fonts) and learned aids for vision problems, including object recognition. None of these approaches, however, involves applying genetic programming or genetic algorithms directly to arbitrary signal types and performing signal understanding on the basis of that input.

Thus the need exists for a learning architecture capable of creating a complete classification system for signal understanding that is independent of the target signal type, size, or complexity. Such a system would permit the automatic recovery of signal classes from a signal database. With such a learning architecture, the user need only provide input of what kind of signals the user hopes to find, not input concerning how to find it. This system would be able to find specific information in the increasingly numerous and growing repositories of unlabeled information available such as on the Internet.

SUMMARY OF THE INVENTION

The present invention is directed to a method of generating a classifier for signal classification based on a plurality of classification programs. The method is comprised of the steps of:

(a) operating on a plurality of C types of input signals, each having a known label, with a plurality of classification programs from a population of classification programs to produce a plurality of output values classifying the C types of input signals;

(b) measuring errors in the plurality of output values relative to the known labels;

(c) distributing the plurality of classification programs among C groups where each of the C groups is the best able to classify one of the C types of input signals from other of the C types of input signals;

(d) placing the distributed classification programs into a new population of classification programs in accordance with a first predetermined function;

(e) modifying certain of the plurality of classification programs in the new population;

(f) repeating steps (a) through (e) for a predetermined number of iterations based on predetermined criteria;

(g) selecting those programs from each group that are the best able to classify the input signals associated with the group from all other input signals for inclusion in a hierarchy of C systems, default weights being assigned to each of the selected programs and each of the C systems;

(h) operating on an input signal having a known label with the selected programs to produce a plurality of output values;

(i) determining an output value for each of the C systems by combining the output values from the selected programs within each of the C systems according to a second predetermined function of the output values and the weights of the selected programs;

(j) determining a signal classification output value by combining each of the output values from each of the C systems according to a third predetermined function of the output values and the weights of the C systems;

(k) measuring errors in the output values of the selected programs and the output values of the C systems relative to the known label;

(l) adjusting the weights assigned to each of the selected programs and each of the systems in accordance with the errors relative to the known labels; and (m) repeating steps (h) through (l) for a number of iterations based on predetermined criteria to generate a classifier.

The signal classifier produced by this method can be used for any signal type, size, or complexity. Once the classifier is shown examples of desired signal classes, the classifier can automatically recover signals of the desired class from a signal database. In the data recovery process, no human intervention or signal preprocessing is necessary.

The present invention is also directed to a method of generating a population of operator programs to optimize the functioning of computer programs on which said operator programs operate. This method is comprised of the steps of:

(a) operating on a plurality of input computer programs within a population of computer programs with a plurality of operator programs from a population of operator programs to produce a plurality of output computer programs;

(b) measuring fitness values of said input and output computer programs as a function of the errors in output values of said input and output computer programs relative to known reference values;

(c) measuring fitness values for each of said operator programs, said fitness values being a function of said fitness values of said input and output computer programs;

(d) placing said operator programs in a new population of operator programs in accordance with a predetermined function, wherein the number of each operator program in the new population is related to its fitness value;

(e) modifying certain of said operator programs; and (f) repeating steps (a) through (e) for a number of iterations based on predetermined criteria.

This second method concerns the modification of a main population of computer programs, which may or may not comprise signal classification programs, by the use of a separate population of operator programs. The purpose of the operator programs is to change the main population of programs to make it evolve while the population of operator programs evolves at the same time. The fitness of an operator is a function of how often and by how much the one or more programs it generates at one time as output are better than the one or more programs it received as input. The process of coevolution of the main and operator populations feeds back not only at the fitness level, as in most cases of coevolution, but also at the level of the process by which the pools are evolved.

The present invention as described above permits the construction of a signal classifier capable of classifying signals regardless of their type, size or complexity. These methods allow a user to train a population of classification programs without human intervention following the input of training signals. The methods used to train a population of classifier programs can be applied to populations of other kinds of programs. Those, and other advantages and benefits of the present invention, will become apparent from the Description of the Preferred Embodiments hereinbelow.

BRIEF DESCRIPTION OF THE DRAWINGS

For the present invention to be clearly understood and readily practiced, the present invention will be described in conjunction with the following figures wherein.

DESCRIPTION OF THE PREFERRED EMBODIMENTS

OVERVIEW

Figure 1:
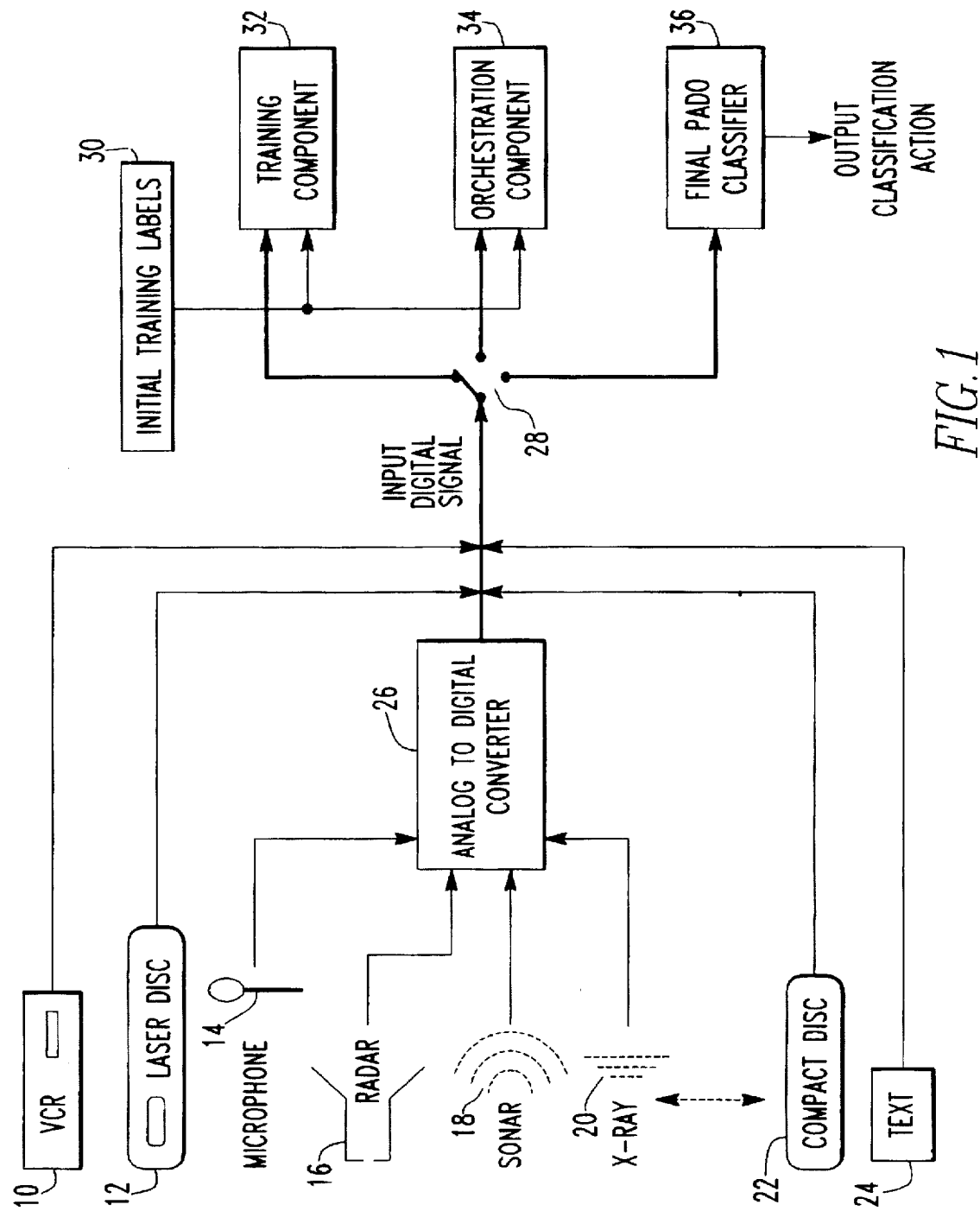
FIG. 1 is a high level block diagram illustrating a method for generating a classifier for signal classification based on a plurality of classification programs constructed according to the teachings of the present invention.

FIG. 1 is a high level block diagram illustrating a method for generating a classifier for signal classification based on a plurality of classification programs constructed according to the teachings of the present invention. A source of digital signals, such as a VCR 10, laser disk 12, compact disk 22, or text input means 24, provides raw signal data using techniques well known in the art. Analog signal sources, such as a microphone 14, radar signal input device 16, sonar signal input device 18, or x-ray equipment 20, can also provide raw signal data in accordance with well-known techniques, although such analog signals must, prior to use, be converted to digital signals using an analog to digital converter 26. Following the input of signals from one of the signal sources, a switch 28 directs the signals to the plurality of computer programs used in this method.

Figure 2:
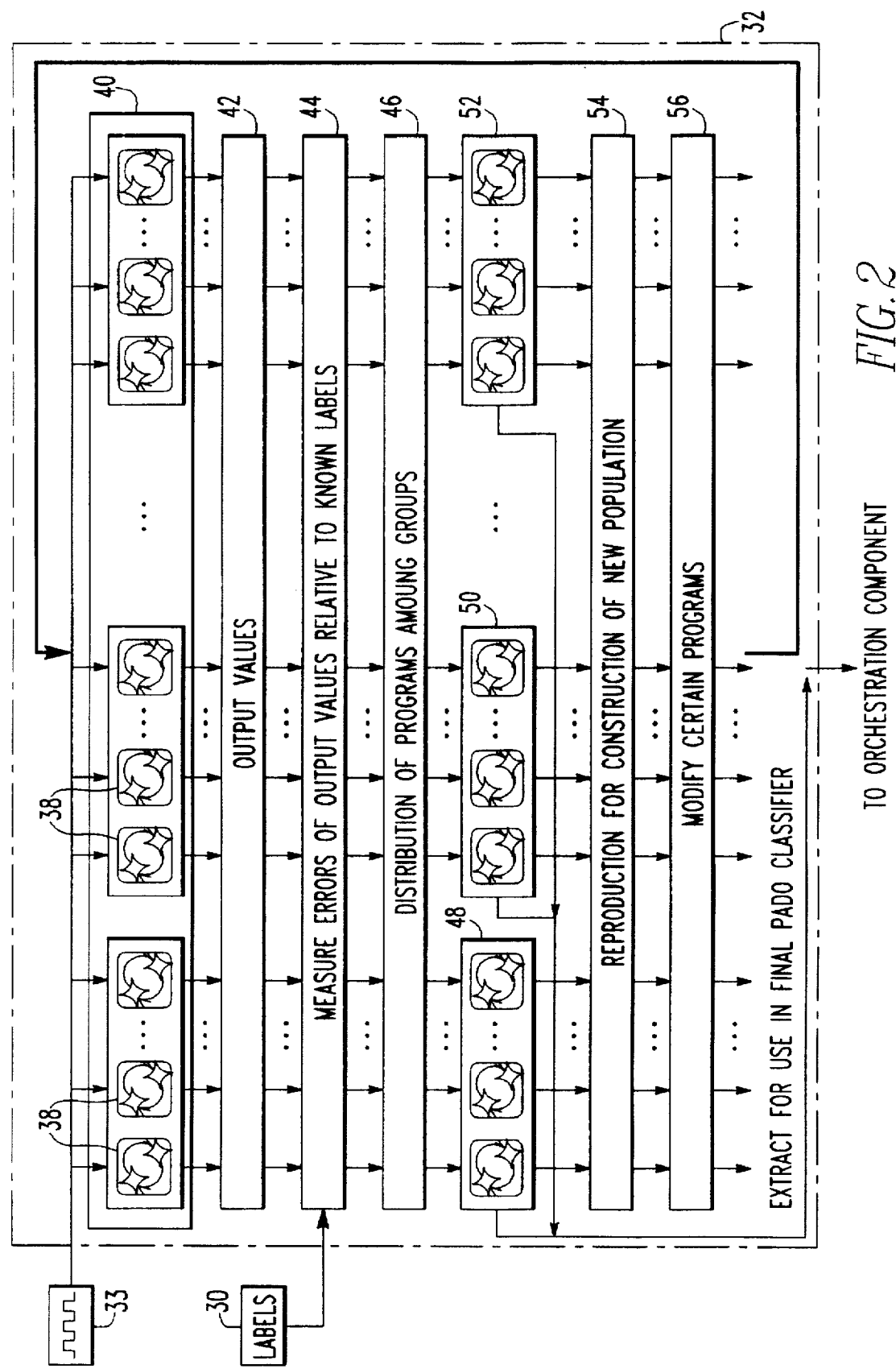
FIG. 2 is a flow chart illustrating the steps carried out in the training component illustrated in FIG. 1.
Figure 3:
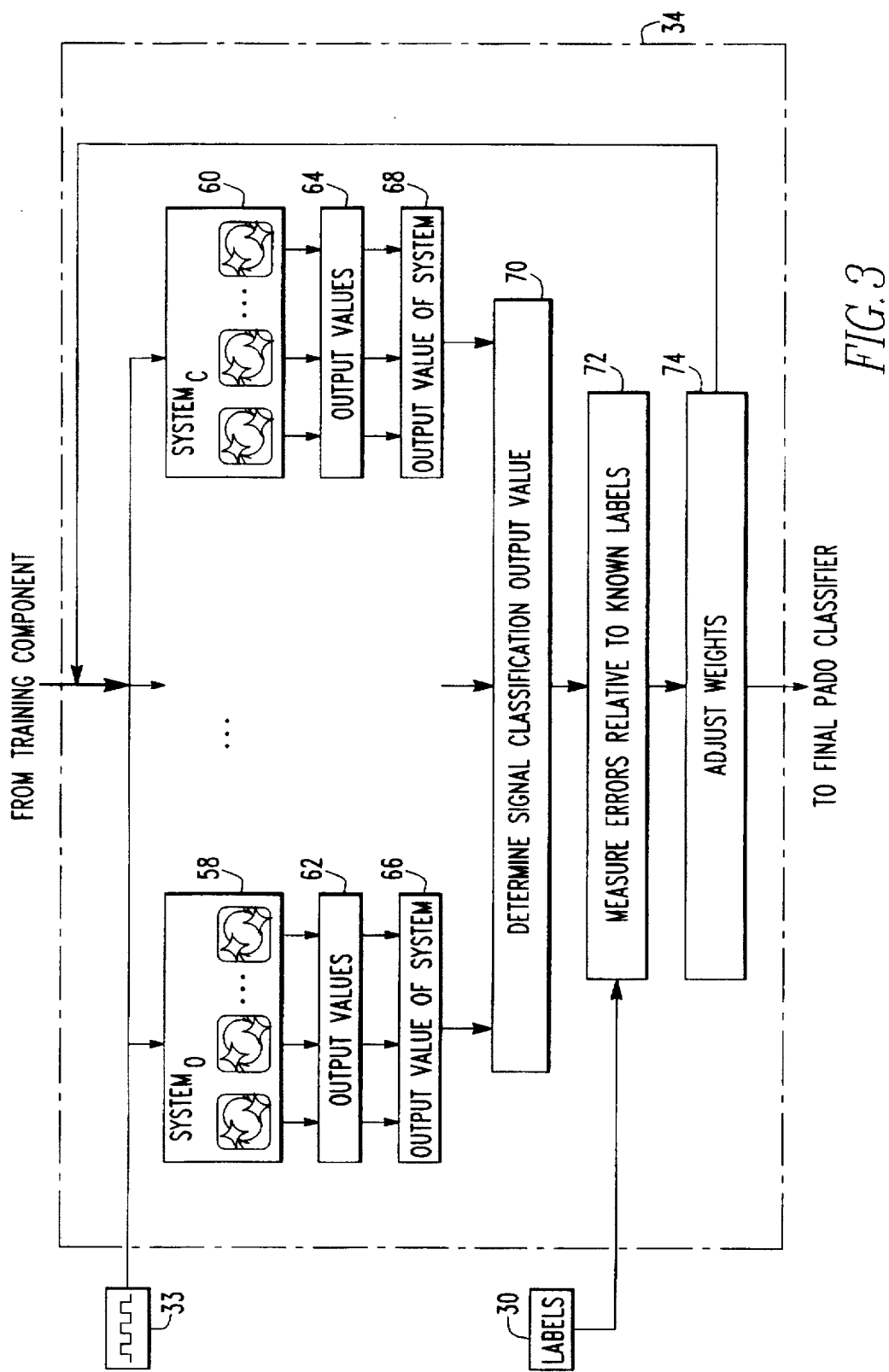
FIG. 3 is a flow chart illustrating the steps carried out in the orchestration component illustrated in FIG. 1.

The method of generating a classifier for signal classification can be broken down into three stages, the training component 32, the orchestration component 34, and the final classifier 36. FIG. 2 is a flow chart illustrating operations taking place in the training component, while FIG. 3 is a flow chart illustrating operations in the orchestration component. The classifier generated by this method 36 can accept signals from digital and analog signal sources such as the sources depicted in FIG. 1 as 10, 12, 14, 16, 18, 20, 22, 24 and produce as output an output classification action.

DETAILED DESCRIPTION

Generating a Classifier for Signal Classification

The purpose of the training phase shown in FIG. 2 is to train classification programs to classify input signals. A plurality of classification programs 38 from a population of classification programs 40 operates on a plurality of signals 33 associated with known training labels 30 from one of the signal sources illustrated in FIG. 1. These signals fall within C types chosen by the user. The classification programs produce output values 42 classifying the C types of signals.

Errors in the output values 42 are then measured relative to the known labels 30 at step 44. The classification programs 38 are then distributed at step 46 among C groups, depicted in FIG. 2 as 48, 50, and 52. Each of the groups is best able to classify one of the C types of input signals from all other of the C types of input signals.

One preferred embodiment involves distributing the programs at step 46 by ranking each classification program according to its ability to discriminate an input signal from all other input signals, assigning the classification program with the highest rank corresponding to the input signal to the group corresponding to the input signal, and repeating these steps until all the classification programs have been assigned to one of the groups.

Following distribution of the programs 38 among the C groups 48, 50, 52, a new population of programs is constructed. Programs 38 are placed into the new population in numbers governed by a first predetermined function. This is a process of reproduction shown at step 54 and known in the genetic programming art wherein the number of copies of a given program placed into the new population is proportionate to the program's fitness in classifying signals. The process is known as "fitness proportionate reproduction."

In a preferred embodiment, the reproduction of step 54 is accomplished by ranking each classification program according to its ability to discriminate an input signal from all other input signals and determining the number of classification programs in a new population according to a function of the program's rank within its group. One possible function is:

2*rank(I)/(P/C)

where rank(I) is the program's rank within its group, P is the number of programs in the population of classification programs, and C is the number of groups. This method is called "rank fitness proportionate reproduction."

In another preferred embodiment, the reproduction of the step 54 can be based on a function of the program's rank order within a set of classification programs that is a sub-set of its group. This process is known in the art as "tournament selection."

Following reproduction, programs are modified at step 56 using genetic programming techniques. This process can be accomplished by selecting a plurality of programs from the population and either adding or removing fragments of code from the classification programs. Also, modification may involve selecting a plurality of programs from the population, removing portions of these programs, and replacing these portions with other code. These processes are known as "mutation" and "crossover," which are described in greater detail hereinbelow.

The preferred means to perform modifications is the use of operator programs known as "smart operators." Smart operators are themselves computer programs whose function is to accept computer programs as input and produce as output computer programs that are more fit. When operating on classification programs they produce classification programs that are better able to classify input signals of a given type from all other signals. The smart operators can exist in a separate population which coevolves with the population of classification programs. That is, during the process of generating a classifier for signal classification in which the classification programs evolve and improve, the smart operators performing operations such as mutation and crossover are themselves evolving and improving so that they become better at producing increasingly fit classifier programs. Such a process is an instance of the method depicted in FIG. 5 and described hereinbelow.

In this process of coevolution, smart operators operate on classification programs to produce modified programs. The fitness of the smart operators is then measured. Fitness of the smart operators is a function of the fitness of the output classification programs in comparison to the fitness of the input classification programs. Operator programs are then subject to fitness proportionate reproduction. They can also be modified using genetic programming techniques such as mutation and crossover.

Following the modification step 56, the new population becomes the population 40 shown at the top of FIG. 2. The new population is then subjected to the same steps as the first population: operation on input signals 33 to produce output values 42; error measurement at step 44; distribution of programs at step 46 among groups 48, 50, and 52; reproduction at step 54, e.g. fitness proportionate reproduction; and modification at step 56. The training steps are repeated for a number of iterations based on predetermined criteria. The user may, for instance, cause the training phase to repeat a fixed number of times.

When the user decides to terminate training, the user can extract programs from each of the C groups 48, 50, 52 to pass to the orchestration phase. The programs selected from a given group are those that are best able to classify input signals associated with the group from all other signals.

FIG. 3 shows the second stage of the invention, the orchestration phase. The selected programs from the training phase are placed in a hierarchy of C systems 58, 60. Each of the C systems is best able to classify signals of one of the C types of input signals from all other of the C types of input signals. Weights used in later processes are assigned to each of the selected programs and each of the C systems and the weights are set to default values.

The selected programs within the C systems 58, 60 operate on input signals 33. Like the training phases, these signals have associated training labels 30. The selected programs produce output values 62, 64 in response to the input signals 33.

The output values of the programs within systems 58, 60 are combined to determine an output value of that system 66, 68, respectively. The output value 66, 68 of a system 58, 60, respectively, is a function of the output values 62, 64 of the programs within it and the weights associated with these programs. The output values 66, 68 of the C systems are in turn combined at step 70 to determine a signal classification output value. The signal classification output value is the classifier's best guess as to which of the C types of signals the image belongs to and is a function of the output values 66, 68 of the C systems and the weights of the C systems.

The errors in the output values of the C systems and of the programs within them relative to the training labels 30 are then measured at step 72. The weights assigned to the programs and the C systems are then adjusted in accordance with the errors relative to the training labels at step 74. After adjustment of the weights, the orchestration process is repeated by the input of new signals 33 to the C systems 58, 60; determining output values 62, 64 of the programs; determining output values 66, 68 of the systems; determining a signal classification output value at step 70; measuring errors at step 72; and readjusting the weights at step 74. This process is repeated for a number of iterations based on predetermined criteria. For example, the user may choose to repeat the orchestration phase a fixed number of times.

The output value 66, 68 of a system can be determined using a number of functions. One preferred embodiment is the use of a weighted average of the output values of each of the programs within the system multiplied by the program's weight. Likewise, the signal classification output value determined at step 70 can be based on a number of functions of the output values of the C systems. One preferred embodiment, referred to as MAX, involves multiplying each system's output value by its weight. If the product of a system's output value and weight is greater than the product of every other system's output value and weight, the type of signal corresponding to that system is chosen as the signal classification output value.

Another preferred embodiment is known as NEAREST NEIGHBOR. According to this method, a vector of output values from each of the C systems produced in response to certain training signals is stored. A new vector of output values is generated in response to a new signal. Then, a "distance" value is determined for a system comprising the difference between the output value of that system in response to the new signal and the output value of that system in response to one of the training signals. The difference is multiplied by the system's weight. The total distance value for the training signal is the sum of distance values for each system. Total distance values are determined for each training signal. The type of signal having a total distance value that is lower than every other type of signal is chosen as the signal classification output value. More complicated NEAREST NEIGHBOR functions can also be used.

Once the final classifier 36 is generated, it can be used to classify unknown signals. This is the ultimate purpose of the classifier for signal classification.

Signals 33 from one of the signal input sources 10, 12, 14, 16, 18, 20, 22, 24 are accepted as input by the programs within the final classifier 36. Similar to the orchestration phase depicted in FIG. 3, the programs in the final classifier produce a plurality of output signal values 62, 64. An output value 66, 68 for each of the C systems is determined, and a signal classification output value is determined at step 70. A difference between the steps taken by the final classifier 36 and the orchestration component 34 shown in FIG. 3 is that the final classifier 36 does not measure errors of the output values relative to known labels (step 72) or adjust the weights of the programs and systems (step 74) within the classifier. These steps are particular to the orchestration component 34 and need not be repeated by the final classifier 36.

The final classifier 36 generates a signal classification output value. As in the orchestration component 34, the signal classification output value is the classifier's best guess as to signed type. For example, assume a final classifier 36 had been trained to identify seven types of household objects. The classifier could then be used to process images containing these objects. The final classifier returns a signal classification output value identifying which signal type appears in each image. The classifier can also produce a confidence value indicating the classifier's degree of confidence that its designation of signal type is correct.

In another practical application of the invention, a final classifier 36 can be trained to identify signal types among signals stored in a database. For example, assume a final classifier had been trained to identify John Wayne from various still photographs. The classifier could then be used to search each still frame of a movie to identify in which frames the famous actor appears.

Figure 4:
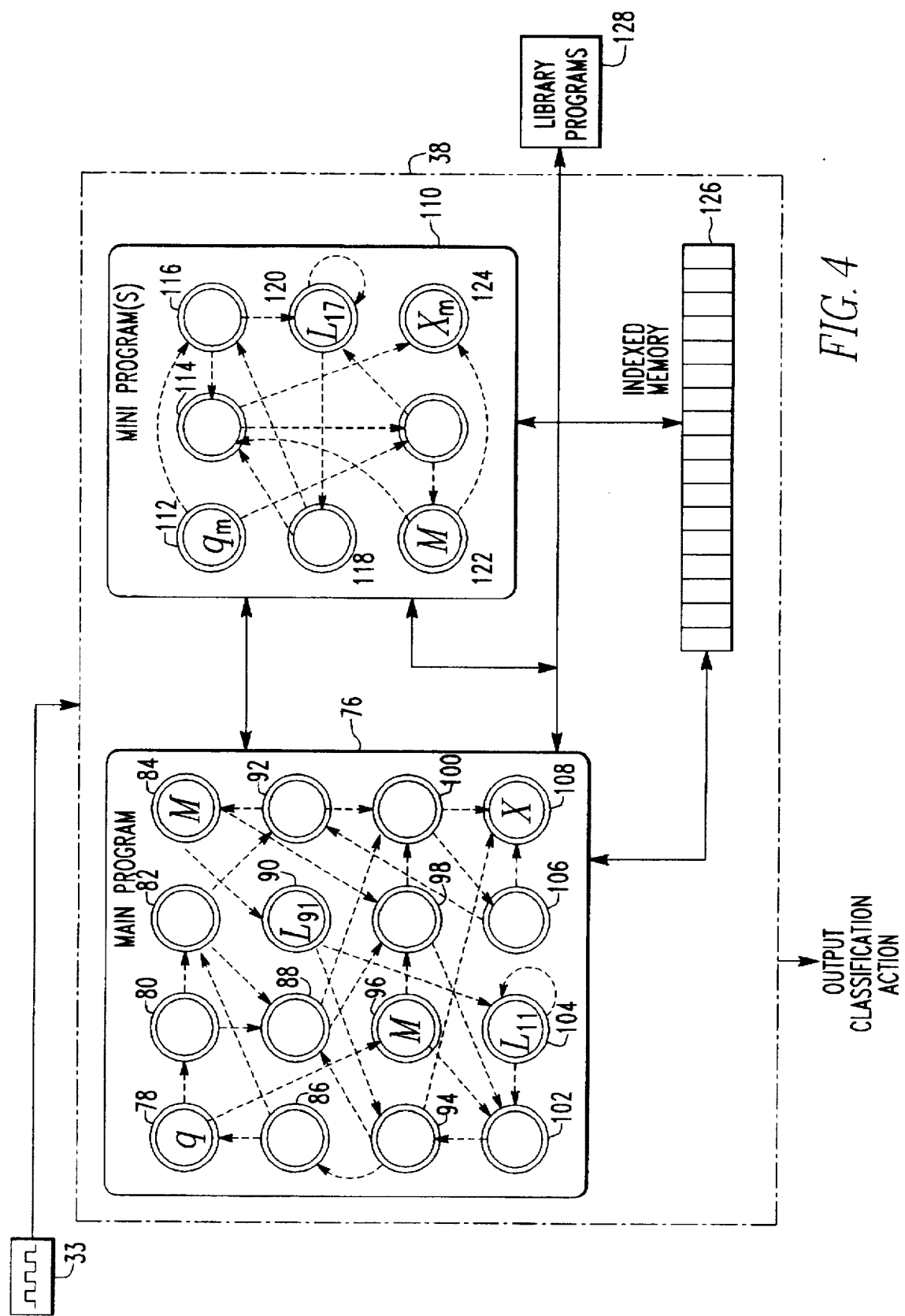
FIG. 4 is a drawing showing the structure of a program utilized by the present invention.

FIG. 4 shows the preferred embodiment of a program 38 used in connection with the present invention. Each program 38 has a main program 76 and mini-programs 110. Each program 38 is constructed as an arbitrary directed graph of N nodes 78, 80, 82, 84, 86, 88, 90, 92, 94, 96, 98, 100, 102, 104, 106, 108. As such, each node can have as many as N arcs outgoing. These arcs indicate possible flows of control in the program. In a program used in the present invention each node has two parts: an action and a branch-decision. Each program has a private stack and an indexed memory 126. All actions pop their inputs from this stack and push their result back onto the stack. These actions are the equivalent of terminals and non-terminals known in the genetic programming art. The indexed memory 126 is effected in a manner well known in the art via READ and WRITE actions.

After the action at a given node 78 is executed, an arc will be taken to a new node, either 80 or 96. The branch-decision function at the current node will make this decision. Each node has its own branch-decision function that may use the top of the stack, a previous state number, a memory 126, or constants to pick an arc to the next node.

There are several special nodes shown in FIG. 4. Node q 78 is the start node. It is special in no other way than it is always the first node to be executed when the program begins. Node X 108 is the stop node. When this node is reached, its action is executed and then the program halts. When a program halts, its response is considered to be the current value residing in some particular memory location (e.g., response=Memory[0]). If a program halts sooner than a pre-set time threshold, it is started again at its start node 78 (without erasing its memory or stack) to give it a chance to revise its confidence value. A weighted average of the responses the program gives on a particular execution is computed and interpreted as the answer (confidence). The weight of a response at time $t_i$ is i. Later responses count more towards the total response of the program. Because of the time threshold, the programs are guaranteed to halt and respond in a fixed amount of time.

Nodes M 84, 96 execute private mini-program 110 as its action. It then executes its branch-decision function as normal. The mini-program 110 associated with each main program 76 bears similarity to the concept of ADF's (automatically defined functions). A node calling a mini-program may be placed at any point in the main program 76 and a mini-program 110 evolves along with the main program.

Mini-programs 110 are in every way normal programs of the kind used in the present invention. Like a main program, a mini-program is an arbitrary graph of nodes 112, 114, 116, 118, 120, 122, 124. The size of mini-programs is not constrained to be smaller than the main programs 76. The name mini denotes only that it is owned by the main program. The mini-programs 110 may recursively call themselves or the globally available Library programs 128, just like a main program may.

The Library programs 128 are globally available programs that can be executed at any time and from anywhere just like the mini-programs 110. But unlike the mini-programs 110, where each mini-program may be run only during the execution of the program of which it is a part, the Library programs 128 are available to the entire population.

Generating a Population of Operator Programs

The invention as described hereinabove involves the steps used in generating and utilizing a classifier for signal classification. One of the methods used to generate a classifier is the use of operator programs called "smart operators," which are capable of performing genetic programming operations on the programs comprising the population of classification programs. The methods used by the smart operators, however, can apply to any population of computer programs, not just signal classification programs. Therefore, the invention is not drawn just to the modification and evolution of signal classification programs with the aid of smart operators, but also the modification and evolution of any programs susceptible to manipulation by smart operators. It is even possible for smart operators to manipulate other operator programs.

Figure 5:
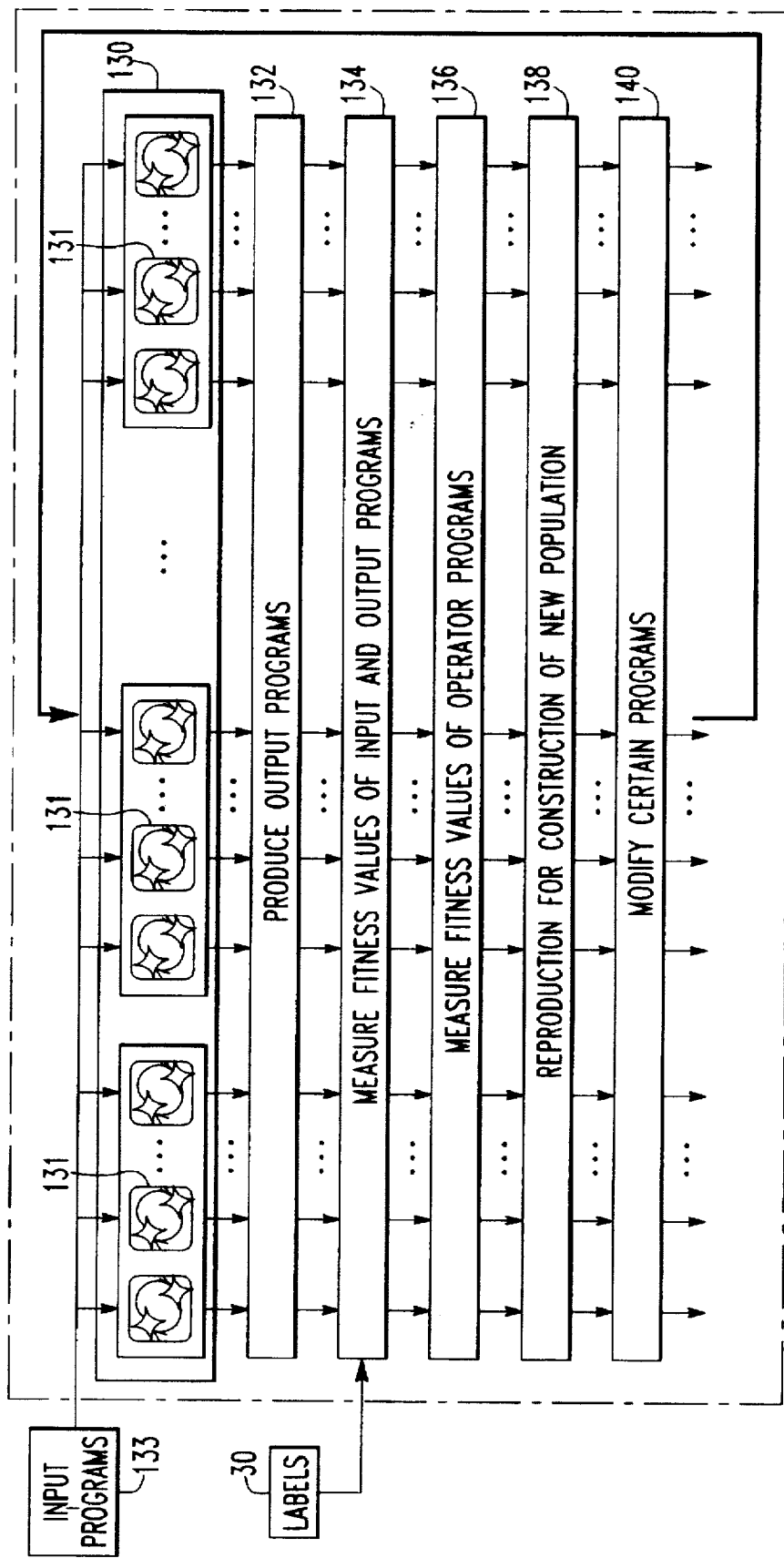
FIG. 5 is a flow chart illustrating the process by which operator programs, which modify other computer programs, evolve and improve their ability to modify the programs used in the present invention.

Specifically, as shown in FIG. 5, the present invention is directed to generating a population 130 of smart operators 131 whose purpose is to optimize the functioning of a population of computer programs using genetic programming operations. The programs to be optimized may or may not be signal classification programs. This process is accomplished by using the operator programs 131 to operate on a plurality of input computer programs 133 to produce a plurality of output computer programs 132. The fitness values of the input 133 and output 132 computer programs are then measured at step 134. These fitness values are based on the errors of each program's output value relative to known reference labels 30.

After measuring the fitness values of the input 133 and output 132 programs, the fitness values of the operator programs 131 can be measured at step 136. The fitness value of an operator is a function of the fitness values of its input 133 and output 132 computer programs. Fitness proportionate reproduction of the operator programs 131 then takes place at step 138 in the fashion as described hereinabove. The operator programs 131 are themselves then subjected to modification by genetic programming techniques at step 140 to produce a new population of operator programs 131. These steps are then repeated for a number of iterations chosen by the user.

There are different ways in which the operator programs 131 can operate on input computer programs 133 to produce output computer programs 132. For example, one preferred embodiment involves the alteration of one input computer program 133 in a manner known as "mutation" in the genetic programming art. One form of mutation involves adding a fragment and directing pointers from the fragment to random locations in the input computer program 133. Another form of mutation involves deleting a fragment and changing pointers to the fragment by redirecting them to locations to which the fragment's pointers were directed. Yet another form involves replacing a fragment with a different fragment.

Another preferred embodiment involves operating on two input programs 133 by removing a fragment from each input program 133 and placing the fragment removed from the first program into the second and the fragment from the second into the first. Using this method, pointers from each fragment are directed into random locations of specific subsets of the program into which it is placed. This process is similar to the process known in the genetic programming art as "crossover."

When using crossover, the operator programs 131 may remove a randomly-chosen fragment from the input computer programs 133. The fragment to be removed by an operator program 131 can also be chosen by other operator programs 131 within the first operator program's 131 population. Likewise, the fragment to be removed by an operator program 131 can be chosen by operator programs 131 outside the first operator program's 131 population.

There are also different ways in which the fitness of operator programs 131 can be measured. One preferred embodiment utilizes a maximum fitness relative measure. Using this method, the fitness of an operator program 131 is a function of the fitness values of the output programs 132, their maximum possible fitness values, the fitness values of the input programs 133, and their maximum possible fitness values. Specifically, the function is:

$$\Sigma \left( \frac{\text{output program fitness} + \text{maximum possible fitness}}{\text{input program fitness} + \text{maximum possible fitness}} - 1 \right)$$

A preferred refinement involves the summation only over the cases in which the fitness value of the output program 132 is greater than the fitness value of the input program 133.

Another preferred embodiment for measuring an operator program's 131 fitness involves measuring the percentage of the time that the fitness value of one of the output computer programs 132 generated by the operator program 131 is greater than the fitness values of the input computer program 133 the output program 132 replaces in the population of computer programs, such as the population of signal classification programs 40. An additional preferred embodiment involves the use of this percentage multiplied by the maximum fitness relative measure described hereinabove as a measure of fitness.

Language Representation

The preferred embodiment of the present invention, whether used for generating a classifier for signal classification or for generating a population of operator programs to optimize the function of computer programs, utilizes a language representation written and designed specifically to work with the present invention. For example, the language representation facilitates the reuse of sub-parts of a program in arbitrary ways. Program parts can be reused through the internal loops in the arcs. A program of N nodes using this language representation might otherwise require 2N, $N^2$, or even more nodes to perform the same operations.

Also, the language representation is designed to suit the needs of the smart operator programs 132. For instance, the language looping functions are largely explicit in this language representation. This explicitness makes it easy for smart operators to suggest changes in computer programs that have a better than random chance of producing highly fit offspring. The source code of one sample program written in such a language is attached hereto as Appendix A. The following is a brief summary of the language actions and their effects. The structures referred to hereinbelow can be seen on FIG. 4.

Algebraic Primitives: ADD, SUB, MULT, DIV, NOT, MAX, MIN

These functions allow basic manipulation of the integers. All values are constrained to the range 0 to Max Size −1. For example, DIV(X,0) results in Max Size −1 and NOT(X) maps {1, Max Size −1} to 0 and {0} to 1.

Memory Primitives: READ, WRITE

These two functions access the memory of the program 126. Each program has a memory which is organized as an array of Max Size integers that can take on values between 0 and Max Size −1. READ(X) returns the integer stored in position X of the memory array. WRITE(X,Y) takes the value X and writes it into position Y of the indexed memory. WRITE returns the old value of position Y (i.e. a WRITE is a READ with a side-effect). The memory is cleared (all positions set to zero) at the beginning of a program execution.

Branching Primitives: IF-THEN-ELSE, PIFTE (Probabalistic If-Then-Else)

In both cases the primitive pops X, Y, and Z off the stack and then replaces either Y or Z (not both) depending on the value of X. For IF-THEN-ELSE the test is (X greater than 0). For EITHER the test is (X less than RandomNumber) where RandomNumber varies between 0 and Max Size −1. These primitives can be used as an action or a branch-decision function. In the former case, they have no effect on the flow of control.

Signal Primitives: POINT, LEAST, MOST, AVERAGE, VARIANCE, DIFFERENCE

These are the language functions that can access the signals. Demonstrating the power and flexibility of the present invention, these same primitives can be used for both the image and sound data. POINT returns the intensity value at that point in the image or sound. The other five return the respective functions applied to the region in the signal that their four parameters (from the stack) specify. DIFFERENCE is the difference between the average values on two halves of a line segment used in connection with image data.

Routine Primitives: MINI, LIBRARY[i]

These are programs 110, 128 that can be called from the main program 76. In addition, they may be called from each other. Because they are programs, and not simple functions, the effect they will have on the stack and memory before completion (if they ever stop) is unknown.

- MINI: Each mini-program 110 is private to the main program 76 that uses it and can be called as many times as desired from this main program. Because each mini-program 110 is an arbitrarily complex program, it: has an arbitrary number of "parameters" which it can pull off the stack. A main program 76 could have any number of mini-programs 110 for its private use.
- (LIBRARY[i] X Y U V ... ): There are 150 library programs 128. The i is not a true parameter. Instead an Action calling a Library program from some program's main program 76, mini-program 110 or another Library program may have the form, as an example, of Library57. Like the mini-programs 110, the Library programs 128 "take" an unknown number of parameters by popping the parameters they "expect" off the parameter stack. All 150 Library programs 128 are available to all programs in the population of programs.

The following actions are available to both the mutation and crossover smart operators: ADD, SUB, MULT, DIV, MIN, MAX, IF-THEN-ELSE, EITHER, LESS, EQUAL, NOT, READ, WRITE, MINI and Constants.

The following is a list of the actions available for the specific use of the smart mutation operator programs 131. CurrentNode is the node under examination by the operator program 131 in CurrentProgram, the program that the operator program 131 is examining.

- Pick at random a new CurrentNode
- Pick the node pointed to by ARC, of CurrentNode to be the new CurrentNode (I=1 or 2)
- Return Value of CurrentNode (Value={Action, Branch-Decision, Branch-Constant, ARC$_I$})
- Return the number of CurrentNode
- Return the fitness of CurrentProgram
- New RANDOM value for a Value of CurrentNode
- New MODIFY value for a Value of CurrentNode
- Write a memory value to a Value of CurrentNode The following is a list of the actions available for the specific use of the smart crossover operator programs 131. The operator program 131 must build up two sets of nodes (one from each of the two programs it receives as input). These two sets are both initialized to empty before the program starts. When the operator program 131 is finished, these two sets will become the program fragments to be switched in the crossover process.

- Pick at random a new CurrentNode$_V$ (V=Program$_1$ or Program$_2$)
- Pick a specific node to be the new CurrentNode$_V$
- Pick node pointed to by ARC$_I$ of CurrentNode$_V$ to be the new CurrentNode$_V$
- Add CurrentNode$_V$ to SET$_V$
- Add Children of CurrentNode$_V$ to SET$_V$
- Delete CurrentNode$_V$ from SET$_V$
- Delete Children of CurrentNode$_V$ from SET$_V$
- Switch the elements of SET$_V$ and {Program$_V$—SET$_V$}
- Return Size of SET$_V$
- Return Size of Program$_V$
- Return Number of Children of (IN or OUT) of SET$_V$ that are (IN or OUT) of SET$_V$
- Return a Value of CurrentNode$_V$
- Make SET$_V$ be a random set from Program$_V$ An example of this type of operator program 131 is shown in Appendix B. In this example, node 4 of the main program adds the children of CurrentNode$_V$ to SET$_V$. When crossing over fragments from two programs, Program$_1$ and Program$_2$, whether V is Program$_1$ or Program$_2$ will be determined by the parameter value the operator program 131 pulls from the top of the stack.

EXPERIMENTAL RESULTS

In one set of experiments conducted by the inventors, two databases were generated using signals from the real world (i.e., large, unprocessed data from a microphone and a video camera). To run a large number of trials, these experimental databases needed to be reasonably small. For experimental purposes it served to pick a few signal classes that are easy for people to distinguish but do not have simple properties through which they could be classified. One test of the non-existence of these overly simple classification concepts was that all of the individual primitives were applied to signals of each signal type. For example, a global average test (e.g., Average(0,0,255,255) on signal J) was applied to all the signals in both databases. The resulting values did not give enough information to distinguish the signals.

The first database contains 525 three second sound samples. These sounds were taken from the SPIB ftp site in Rice University (anonymous ftp to spib.rice.edu). This database has an appealing seven way clustering (75 from each class): the sound of a Buccaneer Jet Engine, the sound of a Machine gun, the sound of an M109 Tank Engine, the sound on the floor of a car factory, the sound in a car production hall, the sound of a Volvo engine, and the sound of babble in an army mess hall. There are many possible ways of subdividing this sound database; the classes chosen for these experiments are typical of the sort of distinctions that might interest a database searcher.

Figure 6:
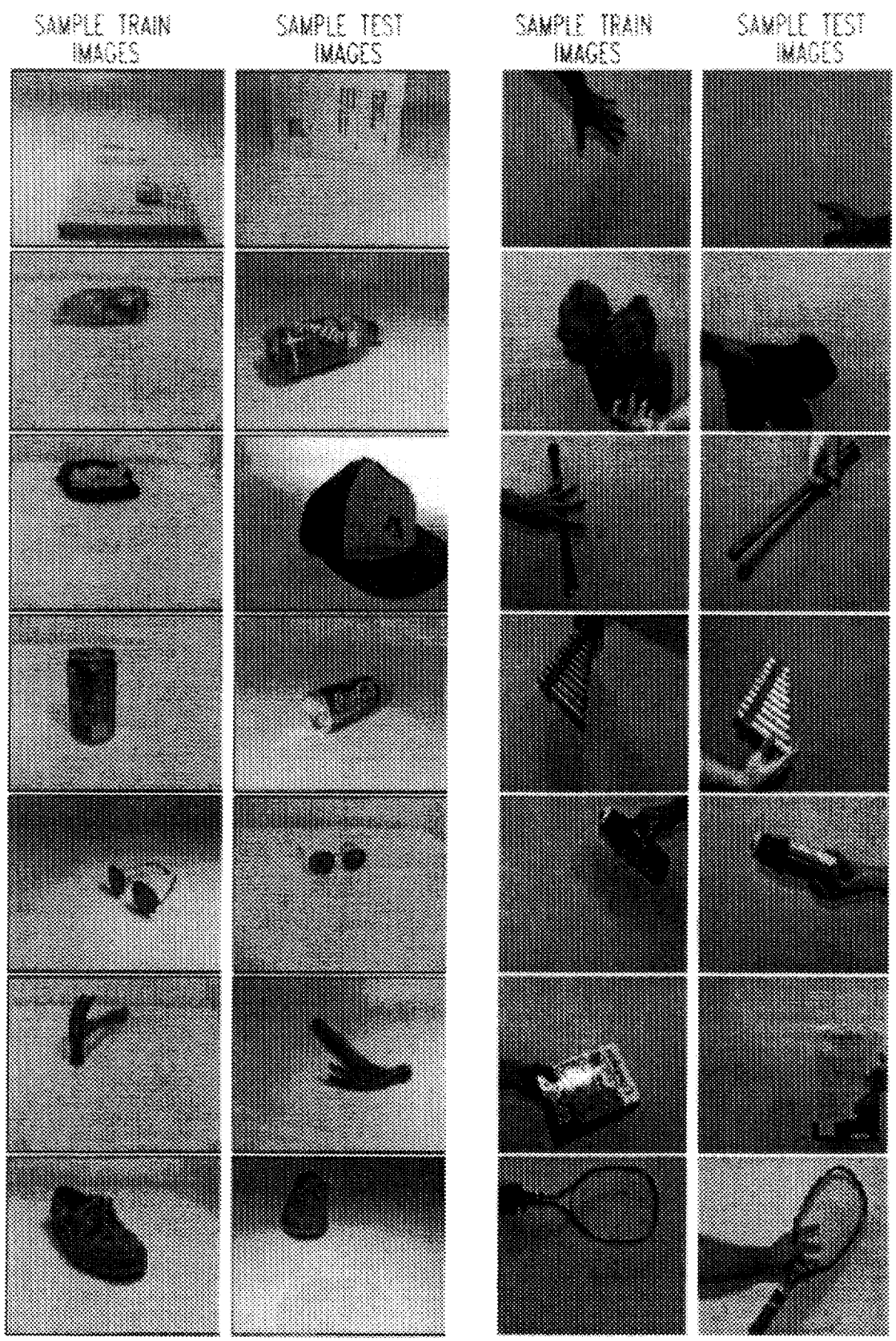
FIG. 6 illustrates 28 randomly chosen images from a set of images used in experiments relating to the present invention.

The second database, a set of 700 video images, was created by Sebastian Thrun for use in his robotics experiments. The lighting, position, and rotation of the objects in the image signal varies widely. The floor and wall behind and underneath the objects are constant. Nothing else except the object is in the image. However, the distance from the object to the camera ranges from one and one half to four feet (0.46 m. to 1.22 m) and there is often severe foreshortening of the objects in the image. This database also has an appealing seven way clustering (100 from each class): Book, Bottle, Cap, Coke Can, Glasses, Hammer, and Shoe. This particular set of classes was used in these experiments because such classes are easily distinguished by people and they are disjoint sets. This database, like any database of complex signals, has an almost infinite number of class clusterings (e.g., "Objects farther than 3.5 feet from the camera", "Non-rigid objects", etc.). The classifier can learn to classify signals from any of these classes. FIG. 6 contains randomly chosen images from the second database.

For each of the following experiments, the database was broken into two halves. The first half was used to train the classifier and the second half was used as a test set. From this test set, seven examples from each class were used to learn the orchestration. The rest of the test set was used to actually test the classifier and produce the results shown below.

For purposes of these experiments, the classifier was trained for a certain number of iterations using the training images. The classifier was then orchestrated for a chosen number of iterations. Following orchestration, the classifier processed data from the test set and the results were recorded. Then, additional training and orchestration was performed and the test set was again shown to the classifier producing new results. Each point of each curve in FIGS. 7a, 7b, 8a and 8b is an average over five runs.

For identifying elements of a class within elements from many classes, accuracy and coverage are traditional measures of performance. Accuracy is the number of true positives divided by the number of false positives plus true positives. Coverage is the number of true positives divided by the total number of positive examples seen. The fitness used for evolutionary learning (training of the programs within the classifier) was based upon distance from correct confidence for each training example. Accordingly, the classifier was not specifically trained for accuracy and coverage, but accuracy and coverage were effectively weighted equally in the fitness measure. In the experiments below, the classifier gives exactly one positive response for each test example seen. In other words, "Sound$_i$ is Machine Gun" or "Sound$_i$ is Volvo Engine", but not both. Given this model of one class chosen per image, if the classifier just guessed, it could achieve an accuracy of 1/7 (14.28%) and a coverage of 1/7 (14.28%).

Sounds

Figure 7B:
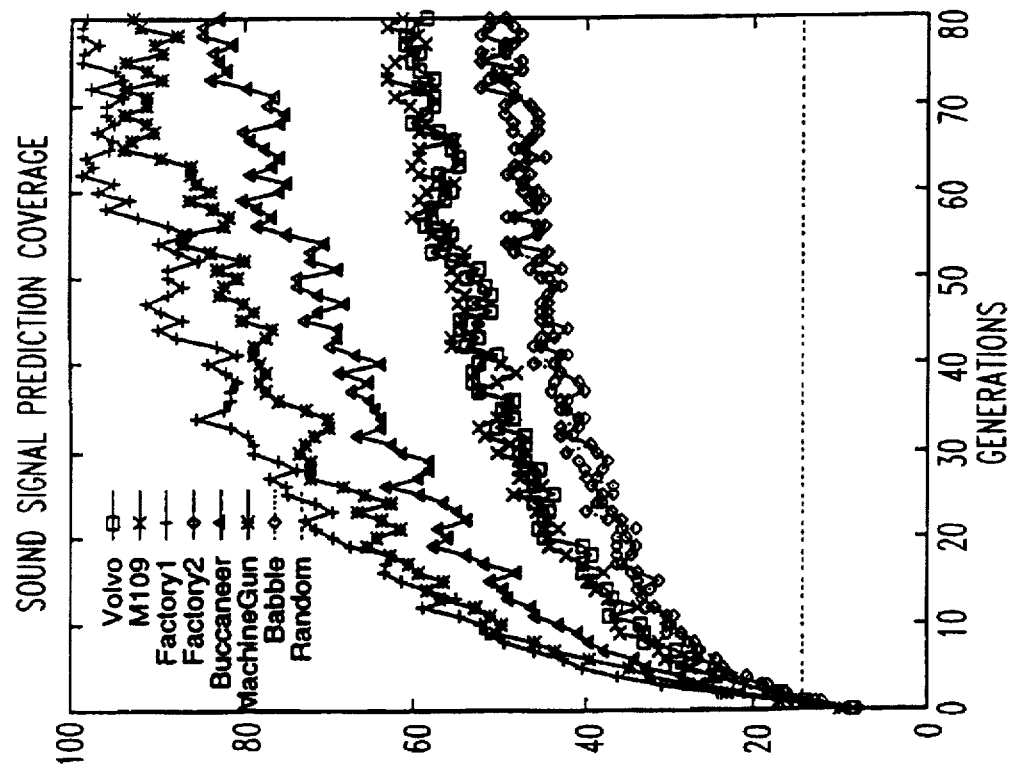
FIGS. 7a and 7b illustrate graphs displaying experimental results in which the classifier was used to classify unknown sound signals.
Figure 7A:
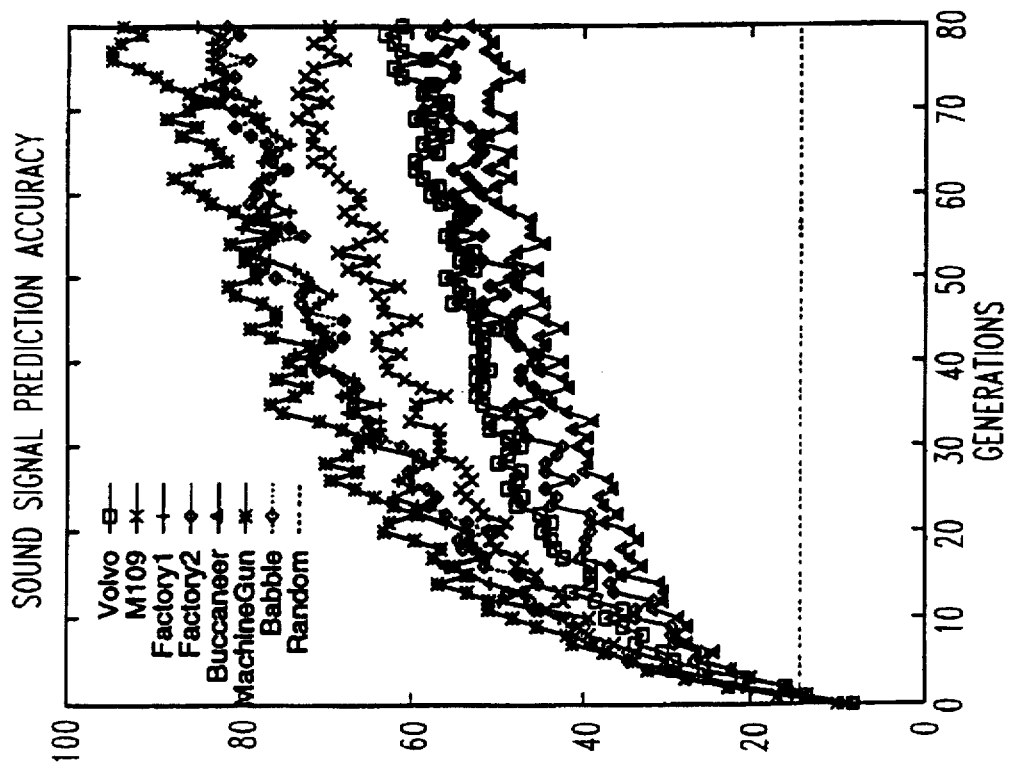

FIGS. 7a and 7b (hereinafter FIG. 7) show the classifier's performance on the sound database. In both graphs there is some discrepancy between the classifier's performance for different sound classes. This is natural since some sounds are more unique or constant. Sounds that can easily be confused with other sounds, or sounds whose characteristics vary widely between samples, are necessarily harder to pick out with high accuracy and high coverage. It is significant that the test sounds are ones that the classifier has never heard. The training sounds were similar, but not the same.

Using the sound of the M109 tank engine as an example, the classifier's performance in the FIG. 7 accuracy graph shows that by generation 80, the classifier has achieved a database retrieval accuracy of about 70% on M109 tank engine sounds it has never heard before. Thus, 70% of the sounds it returns will in fact be sounds of an M109 tank engine. The FIG. 7 coverage graph shows that the classifier database retrieval coverage is about 60% on the previously unheard M109 tank engine sounds. Accordingly, the pool of sounds the classifier retrieved includes 60% of all the tank sounds in the entire database. Both of these numbers, as mentioned before, would be about 14% if the classifier had just been guessing.

The performance of the classifier is significant in light of the primitive level of access that the classifier was given to these sounds. None of the many well known sound processing algorithms were used on the sounds or given to the classifier to help its access of the sound signals. Being able to get no more than the most basic data about a sequence of numbers (POINT, AVERAGE, etc.), any real "features" had to be created as the signal classification programs evolved. Our current work includes giving the signal classification programs primitives that are both more signal-specific and more powerful. Early results indicate that further performance improvements in the classifier are possible when the classifier has to invent less for itself.

The representation of the signals can also make a problem harder or easier. In these experiments, the representation for the sounds given to the classifier was purposefully made more difficult to "understand" to test the classifier's ability to process confusing representations. The sounds are sound waves with 8 bits per sample and 19,800 samples per second of sound. Therefore, each 3 second sound sample is about 60,000 numbers, which are usually represented as numbers between −128 and +127. The sounds the classifier was given access to were the same 60,000 numbers but now in the range {0 . . . 255}. Consequently, the "0 line" around which sounds are partly symmetric has been moved to 128. No information is lost in this transformation, but the important sound features may have become a little more difficult to extract.

Vision

Figure 8B:
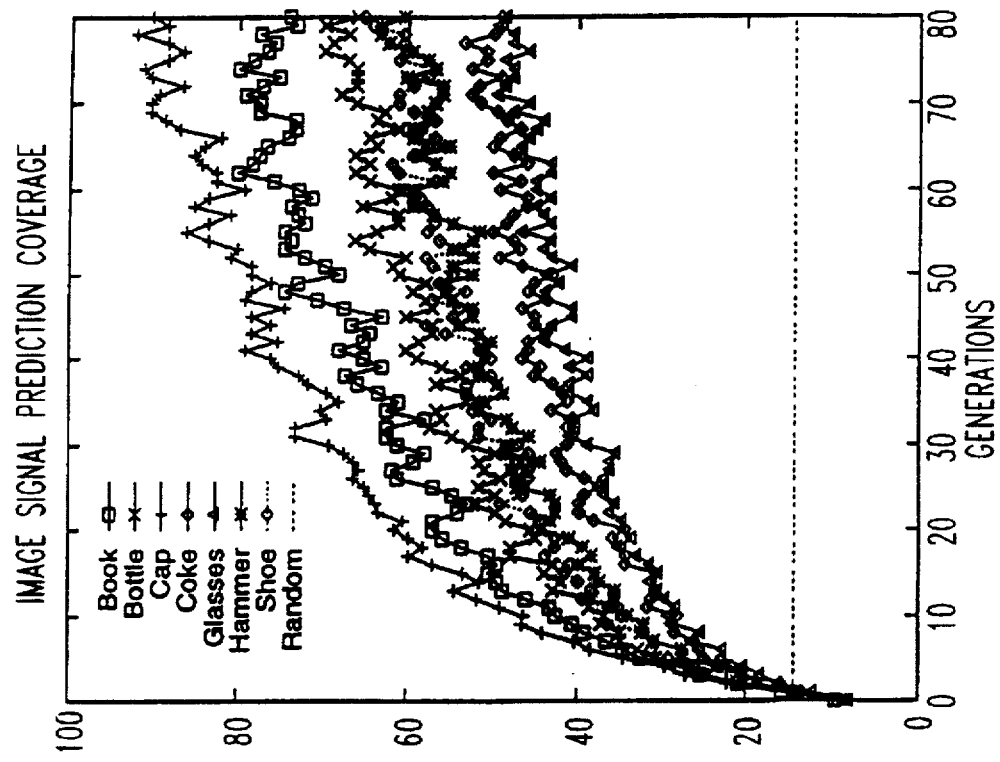
FIGS. 8a and 8b illustrate graphs displaying experimental results in which the classifier was used to classify unknown video image signals.
Figure 8A:
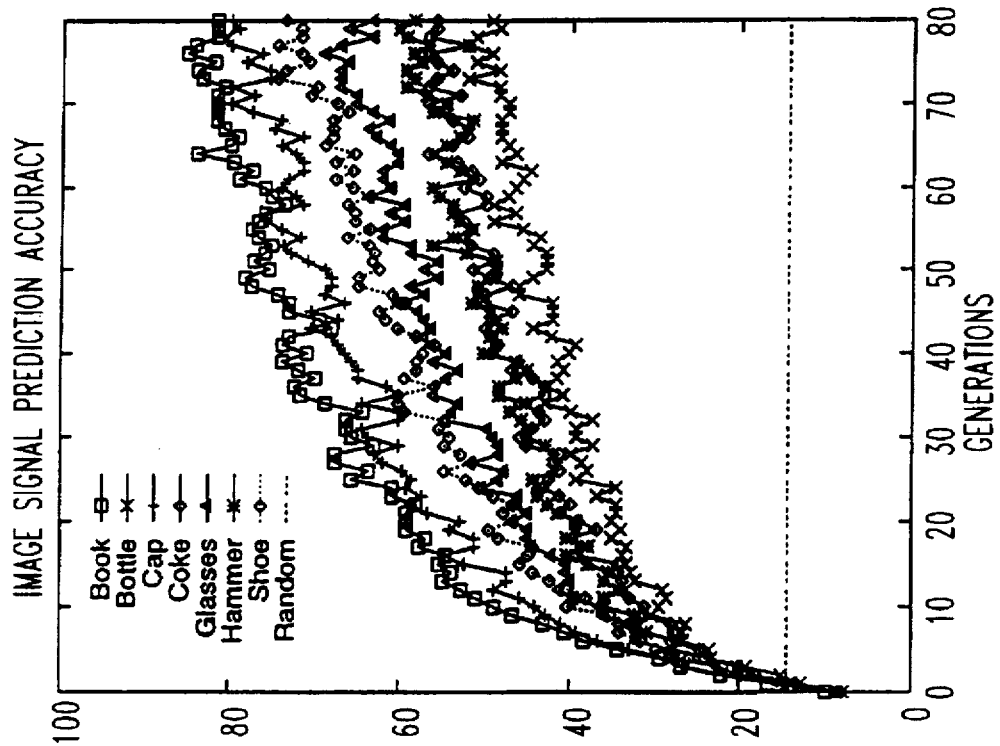

FIGS. 8a and 8b (hereinafter FIG. 8) show the classifier's performance on the image database. In both graphs there is some discrepancy between the classifier's performance for different image classes. As with the sound results, this is natural since some images are more unique or constant. Images that can easily be confused with other images or image classes whose characteristics vary widely between image samples are necessarily harder to pick out with high accuracy and high coverage. Again, it is significant that these are images that the classifier has never seen. The training images were similar, but not the same. FIG. 6 shows just how different the training and testing images are.

The classifier's performance data mining for images (e.g., images of shoes) is shown in FIG. 8. The image accuracy graph shows that by generation 80 the classifier has achieved a 75% database accuracy retrieving images of shoes it has never seen before. Thus, three out of four images it returns will in fact be images of shoes. The image coverage graph shows that classifier's database coverage retrieval of previously unseen shoe images is about 65%. Accordingly, the pool of images the classifier retrieved includes 65% of all the shoe images in the entire database. Again, both of these numbers would be about 14% if the classifier had been guessing.

There are innumerable image-specific algorithms for processing images to bring out particular image features. These range from edge segmentation, to vanishing point analysis, to texture region grouping. None of these image-specific algorithms were given to the classifier to use in classifying the images, although the classifier would certainly have done better with access to these more "helpful" algorithms. The present invention can automatically produce a usable system for signal database retrieval with no help from the user other than a few labeled examples. These results for image signal understanding were accomplished with the same basic signal access primitives used for sound signals: POINT, AVERAGE, MOST, LEAST, VARIANCE, and DIFFERENCE.

The present invention requires only the use of these basic signal inspection primitives. The apparent complexity of the image classes used in these experiments makes it apparent that the classifier is developing algorithms for focusing attention and doing more complex image processing. Specialized signal processing algorithms are needed to solve the signal understanding problem. Nonetheless, it is not necessary to determine which of such algorithms are necessary or to supply such algorithms to the classifier. Instead, it is only necessary to supply the basic signal inspection primitives because the classifier can learn the more complex algorithms as needed.

CONCLUSION

The present invention is directed to a method of generating a classifier for signal classification based on a plurality of classification programs, and a method of generating a population of operator programs to optimize the functioning of computer programs on which the operator programs can operate. The invention provides a method of machine learning capable of signal classification for any signal type, size, or complexity without human intervention or preprocessing. While the present invention has been described in conjunction with preferred embodiments thereof, those of ordinary skill in art will recognize that many modifications and variations may be made. The foregoing disclosure and the following claims are intended to cover all such modifications and variations.

What is claimed is:

1. A method of generating a classifier for signal classification based on a plurality of classification programs, comprising the steps of:

(a) operating on a plurality of C types of input signals, each having a known label, with a plurality of classification programs from a population of classification programs to produce a plurality of output values classifying said C types of input signals;

(b) measuring errors in said plurality of output values relative to said known labels;

(c) distributing said plurality of classification programs among C groups where each of said C groups is the best able to classify one of the C types of input signals from other of the C types of input signals;

(d) placing said distributed classification programs into a new population of classification programs in accordance with a first predetermined function;

(e) modifying certain of said plurality of classification programs in said new population;

(f) repeating steps (a) through (e) for a predetermined number of iterations based on predetermined criteria;

(g) selecting those programs from each group that are the best able to classify said input signals associated with said group from all other input signals for inclusion in a hierarchy of C systems, default weights being assigned to each of said selected programs and each of the C systems;

(h) operating on an input signal having a known label with said selected programs to produce a plurality of output values;

(i) determining an output value for each of said C systems by combining the output values from said selected programs within each of said C systems according to a second predetermined function of said output values and the weights of said selected programs;

(j) determining a signal classification output value by combining each of said output values from each of said C systems according to a third predetermined function of said output values and the weights of said C systems;

(k) measuring errors in the output values of said selected programs and said output values of said C systems relative to said known label;

(l) adjusting the weights assigned to each of said selected programs and each of said systems in accordance with the errors relative to said known labels; and (m) repeating steps (h) through (l) for a number of iterations based on predetermined criteria to generate a classifier.

2. The method of claim 1 wherein said step (c) of distributing said plurality of classification programs includes the steps of:

(i) ranking each classification program according to its ability to discriminate an input signal from all other input signals;

(ii) assigning the classification program having the highest rank corresponding to said input signal to the group corresponding to said input signal; and (iii) repeating steps (i) and (ii) until all of the classification programs are assigned to one of said C groups.

3. The method of claim 1 wherein said step (d) of placing said plurality of classification programs in a new population of classification programs includes the steps of:

(i) ranking each classification program according to its ability to discriminate an input signal from all other input signals; and (ii) determining the number of each of said plurality of classification programs in the new population as a function of each program's rank within its group.

4. The method of claim 1 wherein said step (d) of placing said plurality of classification programs in a new population of classification programs includes the steps of:

(i) ranking each classification program according to its ability to discriminate an input signal from all other input signals; and (ii) determining the number of each of said plurality of classification programs in the new population as a function of each program's rank within a set comprising a number of classification programs.

5. The method of claim 1 wherein said step (e) of modifying certain of said plurality of classification programs includes the steps of:

(i) selecting a plurality of classification programs from the population of classification programs; and (ii) adding a fragment to said plurality of classification programs.

6. The method of claim 1 wherein said step (e) of modifying certain of said plurality of classification programs includes the steps of:

(i) selecting a plurality of classification programs from the population of classification programs; and (ii) removing a fragment from said plurality of classification programs.

7. The method of claim 1 wherein said step (e) of modifying certain of said plurality of classification programs includes the steps of:

(i) selecting a plurality of classification programs from the population of classification programs; and (ii) removing portions from each of said selected classification programs and replacing said portions with other portions of classification programs.

8. The method of claim 1 wherein said step (e) of modifying certain of said plurality of classification programs includes the steps of:

(i) selecting a plurality of classification programs from the population of classification programs; and (ii) operating on said selected classification programs with operator programs to produce modified programs.

9. The method of claim 8 additionally comprising the steps of:

(i) measuring fitness of the operator programs as a function of the errors in the output values generated by the selected classification programs and the modified programs relative to the known labels; and (ii) placing the operator programs in a new population of operator programs in accordance with a predetermined operator function, wherein the number of each of the operator programs in the new population is a function of its fitness.

10. The method of claim 9 additionally comprising the step of modifying certain of the operator programs.

11. The method of claim 1 wherein said step (i) of determining an output value for each of said C systems includes the step of determining an output value for each of said C systems by combining the output values from said selected programs within each of said C systems according to a weighted average of said output values using the weights of said selected programs.

12. The method of claim 1 wherein said step (j) of determining a signal classification output value includes the step of determining the signal classification output value to be a value assigned to the type of signal corresponding to one of the C systems, wherein the product of the output value and weight of said one of the C systems is greater than the product of the output value and weight of every other of the C systems.

13. The method of claim 1 wherein said step (j) of determining a signal classification output value includes the steps of:

(i) storing output values of each of the C systems in response to input signals having known labels of each of the C types of input signals;

(ii) for each of the C systems, determining a first value comprising the difference between the output value of the system and the output value of said system in response to one of the input signals of one of the C types of input signals;

(iii) determining a second value comprising the sum of all of the first values for each of the C systems corresponding to one of the input signals of one of the C types of input signals;

(iv) repeating steps (ii) and (iii) for each of the C types of input signals;

(v) determining the signal classification output value to be a value assigned to one of the C types of input signal, wherein the second value corresponding to said one of the C types of input signal is less than the second values corresponding to every other of the C types of input signal.

14. A method of classifying signals using the method of claim 1 to generate a classifier for signal classification based on a plurality of classification programs, and additionally comprising the steps of:

(i) operating on an input signal with the selected programs comprising the classifier to produce a plurality of output values;

(ii) determining the output value for each of the C systems by combining the output values from said selected programs within each of said C systems according to the second predetermined function of said output values and the weights of said selected programs; and (iii) determining the signal classification output value by combining each of said output values from each of said C systems according to the third predetermined function of said output values and the weights of said C systems.

15. The method of claim 14 additionally comprising the step of determining a confidence value by combining each of said output values from each of said C systems according to a fourth predetermined function of said output values and the weights of said C systems.

16. A method of generating a population of operator programs to optimize the functioning of computer programs on which said operator programs operate, comprising the steps of:

(a) operating on a plurality of input computer programs, said input computer programs being from a population of computer programs, with a plurality of operator programs, said operator programs being from a population of operator programs, to produce a plurality of output computer programs;

(b) measuring fitness values of said input and output computer programs as a function of the errors in output values of said input and output computer programs relative to known reference values;

(c) measuring fitness values for each of said operator programs, said fitness values being a function of said fitness values of said input and output computer programs;

(d) placing said operator programs in a new population of operator programs in accordance with a predetermined function, wherein the number of each operator program in the new population is related to its fitness value;

(e) modifying certain of said operator programs; and (f) repeating steps (a) through (e) for a number of iterations based on predetermined criteria.

17. The method of claim 16 wherein said step (a) of operating on a plurality of input computer programs with a plurality of operator programs includes the step of operating on a plurality of operator programs with a plurality of other operator programs.

18. The method of claim 16 wherein said step (a) of operating on a plurality of input computer programs with a plurality of operator programs includes the step of adding a fragment to one of the input computer programs such that pointers from the fragment are directed to random locations in said input computer program.

19. The method of claim 16 wherein said step (a) of operating on a plurality of input computer programs with a plurality of operator programs includes the step of removing a fragment of one of the input computer programs such that pointers directed to said fragment are redirected to locations to which pointers in said fragment had been directed.

20. The method of claim 16 wherein said step (a) of operating on a plurality of input computer programs with a plurality of operator programs includes the step of replacing a fragment from one of the input computer programs with another fragment.

21. The method of claim 16 wherein said step (a) of operating on a plurality of input computer programs with a plurality of operator programs includes the step of operating on two input computer programs with one of said operator programs by:

(i) removing a fragment from each of the input computer programs; and (ii) placing the fragment removed from one of the input computer programs into the other of the input computer programs such that pointers from the fragment are directed to random locations in said other program.

22. The method of claim 21 wherein said step (i) of removing a fragment from each of the input computer programs includes the step of removing a randomly-chosen fragment from each of the plurality of input computer programs.

23. The method of claim 21 wherein said step (i) of removing a fragment from each of the input computer programs includes the step of removing a fragment from each of the plurality of input computer programs wherein said fragment is chosen by other operator programs within the population containing said plurality of operator programs.

24. The method of claim 21 wherein said step (i) of removing a fragment from each of the input computer programs includes the step of removing a fragment from each of the plurality of input computer programs wherein said fragment is chosen by other operator programs within a separate population of operator programs.

25. The method of claim 16 wherein said step (c) of measuring fitness values for each of said operator programs includes the steps of:
  (i) measuring a first sum of the fitness value of the output computer program and the maximum possible fitness value for said output computer program;
  (ii) measuring a second sum of the fitness value of the input computer program and the maximum possible fitness value for said input computer program;
  (iii) determining a ratio of the first sum to the second sum minus one (1); and
  (iv) summing all of said ratios.

26. The method of claim 16 wherein said step (c) of measuring fitness values for each of said operator programs includes the step of measuring the percentage of time that the fitness value of one of the output computer programs generated by one of the operator programs is greater than the fitness values of the input computer program it replaces in the population of computer programs.

27. An apparatus for generating a classifier for signal classification based on a plurality of classification programs, comprising:
  (a) means for operating on a plurality of C types of input signals, each having a known label, with a plurality of classification programs from a population of classification programs to produce a plurality of output values classifying said C types of input signals;
  (b) means for measuring errors in said plurality of output values relative to said known labels;
  (c) means for distributing said plurality of classification programs among C groups where each of said C groups is the best able to classify one of the C types of input signals from other of the C types of input signals;
  (d) means for placing said distributed classification programs into a new population of classification programs in accordance with a first predetermined function;
  (e) means for modifying certain of said plurality of classification programs in said new population;
  (f) means for selecting those programs from each group that are the best able to classify said input signals associated with said group from all other input signals for inclusion in a hierarchy of C systems, default weights being assigned to each of said selected programs and each of the C systems;
  (g) means for operating on an input signal having a known label with said selected programs to produce a plurality of output values;
  (h) means for determining an output value for each of said C systems by combining the output values from said selected programs within each of said C systems according to a second predetermined function of said output values and the weights of said selected programs;
  (i) means for determining a signal classification output value by combining each of said output values from each of said C systems according to a third predetermined function of said output values and the weights of said C systems;
  (j) means for measuring errors in the output values of said selected programs and said output values of said C systems relative to said known label; and
  (k) means for adjusting the weights assigned to each of said selected programs and each of said systems in accordance with the errors relative to said known labels.

28. An apparatus for generating a population of operator programs to optimize the functioning of computer programs on which said operator programs operate, comprising:
  (a) means for operating on a plurality of input computer programs within a population of computer programs with a plurality of operator programs from a population of operator programs to produce a plurality of output computer programs;
  (b) means for measuring fitness values of said input and output computer programs as a function of the errors in output values of said input and output computer programs relative to known reference values;
  (c) means for measuring fitness values for each of said operator programs, said fitness values being a function of said fitness values of said input and output computer programs;
  (d) means for placing said operator programs in a new population of operator programs in accordance with a predetermined function, wherein the number of each operator program in the new population is related to its fitness value; and
  (e) means for modifying certain of said operator programs.

* * * * *

UNITED STATES PATENT AND TRADEMARK OFFICE
CERTIFICATE OF CORRECTION

PATENT NO. : 5,781,698
DATED : July 14, 1998
INVENTOR(S) : Eric Teller and Manuela Veloso It is certified that error appears in the above-indentified patent and that said Letters Patent is hereby corrected as shown below:

On the title page:
Under Inventors: Delete "Astro" and "(Eric)" and substitute therefor –Eric--.

Signed and Sealed this

Twelfth Day of January, 1999

Attest:

*Attesting Officer*    *Acting Commissioner of Patents and Trademarks*